March 23, 1943.  O. N. CHRISTENSEN  2,314,817
ILLUMINATED INSTRUMENT POINTER
Filed March 23, 1939
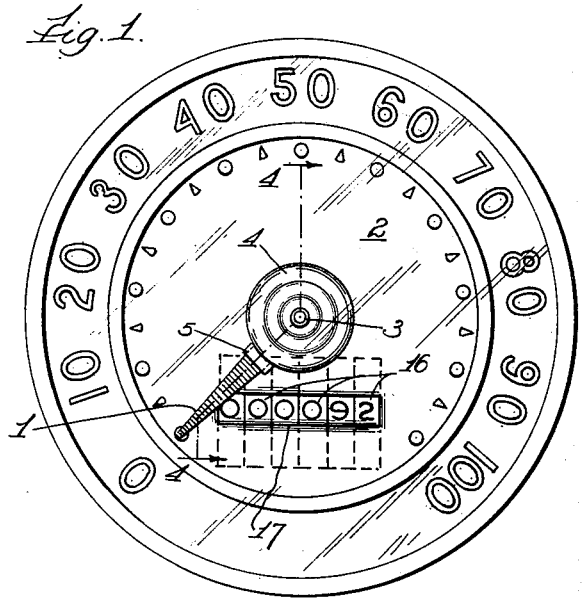
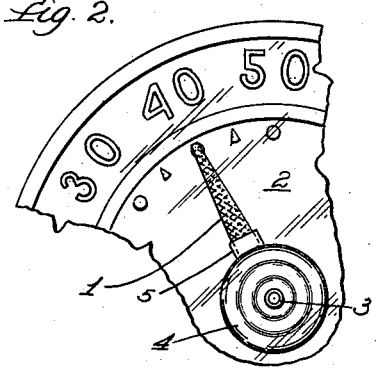
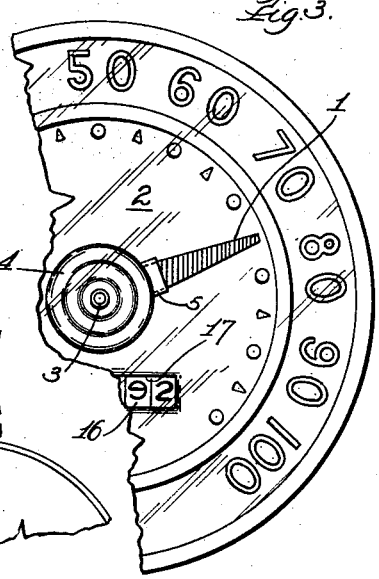
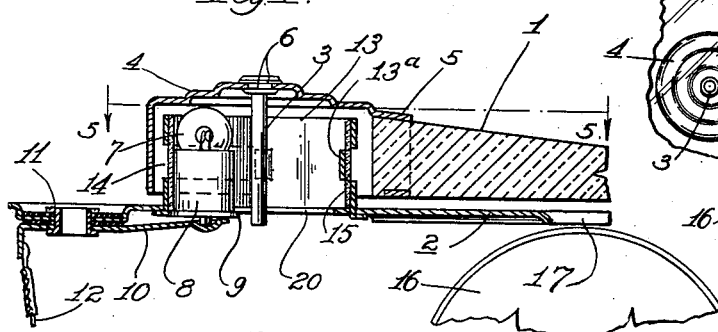
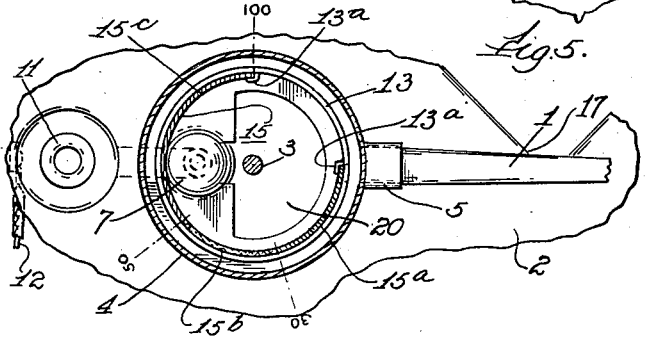
Inventor
O'Neil Christensen
his Attorneys Patented Mar. 23, 1943

2,314,817

UNITED STATES PATENT OFFICE 2,314,817

ILLUMINATED INSTRUMENT POINTER

O. Neil Christensen, Oak Park, Ill., assignor to Stewart-Warner Corporation, Chicago, Ill., a corporation of Virginia Application March 23, 1939, Serial No. 263,584

5 Claims. (Cl. 116—129)

This invention relates to pointers or movable indicators for measuring instruments for various purposes, and it is illustrated as applied to a speedometer of the type adapted for use on motor vehicles. The purpose of the invention is to provide an indicating member or pointer with means for changing its color at different positions in its course as it traverses the scale or dial, and, preferably, such means is of a character to render the indicating element luminescent so that its color shall be clearly visible in the light or in the dark. The invention consists of certain features and elements of construction in combination as herein shown and described and as indicated by the claims.

In the drawing:

Fig. 1 is a face view of a speedometer equipped with an indicating pointer embodying this invention.

Fig. 2 is a fragmentary face view showing the pointer at a different position on the dial.

Fig. 3 is a fragmentary face view showing the pointer at still another position on the dial.

Fig. 4 is a section on an enlarged scale taken substantially as indicated at line 4—4 on Fig. 1.

Fig. 5 is a transverse section taken as indicated at line 5—5 on Fig. 4.

There are various measuring and indicating instruments, particularly those employing circular dials, with one or more rotating pointers or "hands" as indicating elements which are frequently read by observing the approximate angle of the pointer rather than by actually reading the scale itself. And in some instruments of this character there are certain points on the dial which may be considered as critical readings having special significance. In such instruments it would often be of advantage to supplement the indication given by the angular position of the pointer with some other change indicating its relation to the critical points or readings of the dial, as for example, a change in color of the pointer itself. The present invention provides means for accomplishing this change. And, as shown in relation to a speed-indicating instrument for use on a motor vehicle, it serves the purpose of signaling the driver that he is traveling either within a comparatively safe speed range or that his speed is such as to require a special degree of caution, or that his speed has exceeded safe limits and is definitely within a danger zone. In the example illustrated it is assumed that the safe range includes any speed under 30 miles per hour, that between 30 and 50 miles per hour requires special caution in driving, and that speeds above 50 miles per hour are definitely dangerous.

As shown in the drawing, the pointer, 1, may be understood as composed of some translucent material such as Tenite, Lucite, Pyrolin, Catalin, Celluloid or the like, which may be molded in any desired form, and which, in the present instance, may be either substantially clear or of a milky tint. The pointer traverses the dial plate, 2, through which its spindle, 3, projects to support a hollow shell or cap, 4, from which the pointer, 1, extends radially. The shell, 4, is formed with a short radial sleeve portion, 5, into which the pointer is fitted and cemented, or otherwise secured, and at its center the shell, 4, is firmly gripped between flanges, 6, on the end of the spindle, 3. It may be understood that the spindle is rotated through less than a single turn by suitable speed-responsive mechanism, not shown, so that the position to which the pointer, 1, is turned on the scale by the rotation of the spindle, 3, shall indicate the speed of the vehicle on which the instrument is carried.

Within the shell or cap, 4, a small incandescent electric lamp bulb, 7, is mounted in a socket, 8, upstanding from the plane of the dial plate, 2, as seen in Fig. 4. The dial plate may have a cutout opening formed to fit around the cylindrical socket, 8, whose flange, 9, abuts against the under surface of the dial plate. A spring arm, 10, secured by a hollow rivet, 11, in insulated relation to the under side of the dial plate, 2, serves as an electrical contact, and also to uphold the socket, 8, in its position in the dial plate. A feed wire, 12, leading to the contact arm, 10, supplies current for the lamp, 7, the return side of the circuit being grounded through the metallic parts of the instrument.

Upstanding from the dial plate, 2, and suitably secured thereto, is a cylindrical wall, 13, which is formed with a slot, 14, whose angular extent is substantially equal to the angular sweep of the pointer, 1, over the dial plate. This wall, 13, serves as a support for a color screen, 15, which may be of Celluloid, Cellophane, or like translucent material, with its ends caught under lugs, 13ª, at the ends of the slot, 14. As shown, it comprises sections of three different colors. The light from the lamp, 7, shining through the color screen and the slot or window, 14, is transmitted through the translucent pointer, 1, which thus takes on the color of that portion of the screen, 15, opposite which it stands at the moment. The section, 15ª, of the screen which is registered with that portion of the scale from zero to 30 miles per hour, may be green, as indicated in Fig. 5; the next section, 15ᵇ, is indicated as of an angular extent registering with the scale from 30 to 50 miles per hour, and is preferably of an amber hue; while the remainder of the color screen, 15ᶜ, registers with the portion of the scale from 50 miles upwards, and is indicated as red in color. Thus, when the pointer indicates a speed between zero and 30 miles per hour, it will take on a greenish color, suggesting relative safety; between 30 and 50 miles per hour the color of the pointer will be amber, indicating caution, in accordance with the usual color system used in traffic signals; while at any speed above 50 miles per hour the pointer will be illuminated with a bright red glow as a warning to the driver that such speed is relatively dangerous, calling for his alert attention.

It may be understood, of course, that a similar expedient may be employed in other instruments where, for any reason, it is desirable to distinguish between various portions of the scale by a color signal of this nature; for example, a steam gauge might be thus equipped to distinguish between safe and dangerous pressures, or a clock dial might be sub-divided into various sections for purposes of a particular program in connection with which it was employed.

Incidentally, in the present structure, there is included the usual odometer whose numeral dials are seen at 16, showing through a rectangular window, 17, in the dial plate, 2. These dials are usually cylindrical in form, and are so illustrated, a portion of their circular outline appearing in Figs. 1 and 3 below the plane of the dial plate, 2, and its window, 17. Under the hollow shell or hood, 4, the dial plate, 2, is formed with a cut-out opening, 20, of substantial proportions whereby a considerable amount of light is admitted to the place below the dial plate, 2, and thus serves to illuminate the cylindrical surfaces of the odometer dials, 16, so that their numerals appear clearly defined at the window, 17. This effect is heightened if the surface of the dial plate, 2, is relatively dark, while the odometer dials themselves are finished in white or some light color; and to increase the efficiency of the lamp, 7, for this purpose the inner surface of the shell, 4, may be of a bright metal, or may be finished in a light color adapted to reflect a substantial portion of the illumination into the interior of the instrument by way of the opening, 20.

While there is shown and described herein certain specific structure embodying the invention, it will be manifest to those skilled in the art that various modifications and re-arrangements of the parts may be made without departing from the spirit and scope of the invention, and that the same is not limited to the particular form herein shown and described, except in so far as indicated by the appended claims.

I claim:

1. In combination, an instrument dial plate, a rotatable spindle extending through said plate, a hub attached to the spindle at the outer side of the dial plate, said hub having a flange extending transversely of the dial plate and curved in substantially coaxial relation to the spindle, said flange having an opening, a pointer extending from the hub at said opening and radially outward therefrom, and a light-emitting element disposed at one side of the spindle within the curve of said flange and substantially at the same transaxial plane as the opening therein, together with an arcuate color screen fixedly supported in coaxial relation to the spindle between the said light-emitting element and the opening in the flange of said hub, whereby the light from said element modified by the color screen, escapes through said opening and illuminates the pointer.

2. In combination, an instrument dial plate, a rotatable spindle extending through said plate, a hub attached to the spindle at the outer side of the dial plate, said hub having a flange extending transversely of the dial plate and curved in substantially coaxial relation to the spindle, said flange having an opening, a pointer of milky, translucent material secured in said opening and extending radially outward therefrom, and a light-emitting element disposed at one side of the spindle within the curve of said flange and substantially at the same transaxial plane as the opening therein, together with an arcuate color screen fixedly supported in coaxial relation to the spindle between the said light-emitting element and the opening in the flange of said hub, whereby the light from said element, modified by the color screen, escapes through said opening and illuminates the pointer.

3. In combination, an instrument dial plate, a rotatable spindle extending through said plate, a flanged hub attached to the spindle in coaxial relation thereto and opening toward the outer face of the dial plate, the flange of the hub having an opening, a pointer extending from the hub at said opening and radially outward therefrom, and a light-emitting element disposed at one side of the spindle within the curve of said flange and substantially at the same transaxial plane as the opening therein, together with an arcuate color screen fixedly supported in coaxial relation to the spindle between said light-emitting element and the opening in the flange of said hub, whereby the light from said element, modified by the color screen, escapes through said opening and illuminates the pointer.

4. In combination, an instrument dial plate, a rotatable spindle extending through said plate, a flanged hub attached to the spindle in coaxial relation thereto and opening toward the outer face of the dial plate, the flange of said hub having an opening with a pointer of milky translucent material secured in said opening and extending radially outward therefrom, an electric lamp bulb fixedly supported within the hub and at one side of the axis thereof, and an arcuate color screen fixedly supported by the dial plate within said hub between the lamp bulb and the opening in the flange of the hub, whereby the light from said lamp within the hub, modified by the color screen, escapes through said opening in the flange and illuminates and colors the pointer.

5. In a speedometer, a dial plate, a rotatable spindle extending through said plate, a flanged opaque hub on said spindle in front of the plane of said plate, the flange or side wall of said hub having an opening, a pointer extending radially from the hub at said opening, an electric lamp bulb mounted within said hub in front of the plane of the dial plate and substantially at the plane of the opening and illuminating the pointer through the opening in the hub, said dial plate having a window with a dial disposed behind the dial plate for display through said window, said dial plate also having an opening covered by said flanged hub and admitting light from the lamp in said hub to the surface of said dial back of the window for illuminating the displayed portion thereof.

O. NEIL CHRISTENSEN.